(12) United States Patent
Watanabe

(10) Patent No.: US 11,112,759 B2
(45) Date of Patent: Sep. 7, 2021

(54) THERMAL DISPLACEMENT CORRECTION SYSTEM AND COMPUTER

(71) Applicant: FANUC Corporation, Yamanashi (JP)

(72) Inventor: Mitsunori Watanabe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 62 days.

(21) Appl. No.: 16/355,860

(22) Filed: Mar. 18, 2019

(65) Prior Publication Data

US 2019/0294126 A1    Sep. 26, 2019

(30) Foreign Application Priority Data

Mar. 23, 2018  (JP) .............................. JP2018-057188

(51) Int. Cl.
    *G05B 19/4155*    (2006.01)
    *G05B 19/404*     (2006.01)
    (Continued)

(52) U.S. Cl.
    CPC ....... *G05B 13/0265* (2013.01); *G05B 19/404* (2013.01); *G05B 19/4155* (2013.01);
    (Continued)

(58) Field of Classification Search
    CPC .............. G05B 19/404; G05B 19/4155; G05B 2219/49206; G05B 13/0265; G05B 2219/49211; G06N 20/00; B23Q 15/18
    See application file for complete search history.

(56) References Cited

U.S. PATENT DOCUMENTS

| 5,523,953 A | 6/1996 | Araie et al. |
| 6,508,614 B1 * | 1/2003 | Ozaki ..................... B23Q 1/38 |
| | | 310/90.5 |

(Continued)

FOREIGN PATENT DOCUMENTS

| JP | H7-75937 A | 3/1995 |
| JP | H11-114775 A | 4/1999 |

(Continued)

*Primary Examiner* — Ronald D Hartman, Jr.
(74) *Attorney, Agent, or Firm* — Hauptman Ham, LLP

(57) ABSTRACT

A thermal displacement correction system performs thermal displacement correction in cooperation with a thermal displacement correction device and a computer connected via a network. The thermal displacement correction system that corrects thermal displacement caused by processing performed by a machine comprises: the thermal displacement correction device connected to the machine; and the computer connected to the thermal displacement correction device via the network. The computer comprises: a data acquisition unit that acquires environmental data on an external environment of the machine via the network; a correction value inference unit that calculates a correction value using the environmental data; and a correction value output unit that outputs the correction value to the network. The thermal displacement correction device comprises: a correction value acquisition unit that acquires the correction value via the network; and a correction execution unit that performs thermal displacement correction using the correction value.

6 Claims, 12 Drawing Sheets

(51) Int. Cl.
*B23Q 15/18* (2006.01)
*G05B 13/02* (2006.01)
*H04L 29/08* (2006.01)

(52) U.S. Cl.
CPC .... *B23Q 15/18* (2013.01); *G05B 2219/49205* (2013.01); *G05B 2219/49211* (2013.01); *H04L 67/10* (2013.01)

(56) References Cited

U.S. PATENT DOCUMENTS

| | | | | |
|---|---|---|---|---|
| 9,811,073 | B2* | 11/2017 | Nishimura | G05B 19/404 |
| 9,869,992 | B2* | 1/2018 | Takeno | G05B 19/404 |
| 9,983,564 | B2* | 5/2018 | Murahashi | B23Q 11/0007 |
| 10,025,290 | B2* | 7/2018 | Takeno | G05B 19/404 |
| 10,095,215 | B2* | 10/2018 | Qi | G05B 19/404 |
| 10,234,843 | B2* | 3/2019 | Endou | G05B 19/404 |
| 10,401,829 | B2* | 9/2019 | Maekawa | G06N 20/00 |
| 2002/0004688 | A1* | 1/2002 | Kojima | G05B 19/404 |
| | | | | 700/193 |
| 2010/0152881 | A1 | 6/2010 | Ou et al. | |
| 2010/0191365 | A1* | 7/2010 | Yonezu | B23Q 17/22 |
| | | | | 700/174 |
| 2012/0123586 | A1* | 5/2012 | Maekawa | G05B 19/404 |
| | | | | 700/173 |
| 2013/0190921 | A1* | 7/2013 | Maekawa | B23Q 11/0007 |
| | | | | 700/177 |
| 2014/0074299 | A1* | 3/2014 | Endou | G05B 13/02 |
| | | | | 700/275 |
| 2014/0200706 | A1 | 7/2014 | Pruschek et al. | |
| 2015/0276633 | A1* | 10/2015 | Koyama | G01M 99/002 |
| | | | | 702/94 |
| 2015/0286208 | A1* | 10/2015 | Endou | G05B 19/404 |
| | | | | 700/175 |
| 2017/0023417 | A1 | 1/2017 | Koyama | |
| 2017/0090430 | A1 | 3/2017 | Nakazawa | |
| 2017/0091667 | A1* | 3/2017 | Yukawa | G06N 20/00 |
| 2017/0357243 | A1 | 12/2017 | Takayama et al. | |
| 2018/0196405 | A1* | 7/2018 | Maekawa | G06N 20/00 |
| 2019/0099849 | A1* | 4/2019 | Hada | G05B 19/404 |

FOREIGN PATENT DOCUMENTS

| | | |
|---|---|---|
| JP | H11-114776 A | 4/1999 |
| JP | 2003-94291 A | 4/2003 |
| JP | 2014-522529 A | 9/2014 |
| JP | 2017-24108 A | 2/2017 |
| JP | 2017-64837 A | 4/2017 |
| JP | 2017-220111 A | 12/2017 |

* cited by examiner

THERMAL DISPLACEMENT CORRECTION SYSTEM AND COMPUTER

RELATED APPLICATION

The present application claims priority to Japanese Application Number 2018-057188 filed Mar. 23, 2018 the disclosure of which is hereby incorporated by reference herein in its entirety.

BACKGROUND OF THE INVENTION

1. Field of the Invention

The present invention relates to a thermal displacement correction system, and more particularly to a thermal displacement correction system that performs thermal displacement correction in cooperation with a thermal displacement correction device and a computer connected via a network, and the computer.

2. Description of the Related Art

There has been known a thermal displacement correction device that detects thermal displacement occurring in an industrial machine (hereinafter referred to simply as a machine) such as a machine tool, calculates a correction value for thermal displacement, and executes correction. The thermal displacement correction device is typically provided as a function of a machine control device. For example, Japanese Patent Laid-Open No. 7-75937 discloses a control device that generates a model for calculating thermal displacement correction values by machine learning.

Most of the currently popular control devices do not have a function as the thermal displacement correction device or have the function but do not have sufficient calculation accuracy of the correction values. In order to add sufficient functions as the thermal displacement correction device to such a control device, old software needs to be improved or computing power needs to be high enough to process a complicated correction formula. In particular, enormous computing power is required to implement such a machine learning as disclosed in Japanese Patent Laid-Open No. 7-75937. Further, along with an increase in data available for technological innovation and machine learning, calculation accuracy can be improved in some cases by updating correction formulas and models. However, the increase in computing power of the control device, the improvement in software, and updating of correction formulas or models require a huge amount of cost and development man-hours, which are often unrealistically difficult to meet.

SUMMARY OF THE INVENTION

The present invention has been made to solve such problems, and an object of the present invention is to provide a thermal displacement correction system that performs thermal displacement correction in cooperation with a thermal displacement correction device and a computer connected via a network, and the computer.

A thermal displacement correction system according to an embodiment of the present invention is a thermal displacement correction system correcting thermal displacement caused by processing performed by a machine, the thermal displacement correction system comprising: a thermal displacement correction device connected to the machine; and a computer connected to the thermal displacement correction device via a network, wherein the computer comprises: a data acquisition unit acquiring environmental data on an external environment of the machine via the network; a correction value inference unit calculating a correction value using the environmental data; and a correction value output unit outputting the correction value to the network, wherein the thermal displacement correction device comprises: a correction value acquisition unit acquiring the correction value via the network; and a correction execution unit performing thermal displacement correction using the correction value.

In the thermal displacement correction system according to an embodiment of the present invention, the thermal displacement correction device further comprises a device data acquisition unit and a device data output unit, wherein the device data acquisition unit acquires device data indicating a state of the machine, the device data output unit outputs the device data to the network, and the correction value inference unit calculates the correction value using the environmental data and the device data.

In the thermal displacement correction system according to an embodiment of the present invention, the correction value inference unit calculates the correction value using a learning model generated in advance by machine learning.

In the thermal displacement correction system according to an embodiment of the present invention, the computer further comprises a learning unit, wherein the learning unit updates the learning model using at least one of the environmental data and the device data.

In the thermal displacement correction system according to an embodiment of the present invention, the thermal displacement correction system comprises a plurality of thermal displacement correction devices, and the computer is connected to the plurality of thermal displacement correction devices via the network.

A computer according to an embodiment of the present invention is a computer outputting a correction value for correcting thermal displacement caused by processing performed by a machine, the computer comprising: a thermal displacement correction device connected to the machine; a data acquisition unit connected via a network and acquiring environmental data on an external environment on the machine via the network; a correction value inference unit calculating a correction value using the environmental data; and a correction value output unit outputting the correction value to the network.

The present invention can provide a thermal displacement correction system that performs thermal displacement correction in cooperation with a thermal displacement correction device and a computer connected via a network, and the computer.

BRIEF DESCRIPTION OF THE DRAWINGS

The foregoing and other objects and features of the present invention will become apparent from the following description of embodiments with reference to the accompanying drawings in which.

DETAILED DESCRIPTION OF THE PREFERRED EMBODIMENTS

Figure 1:
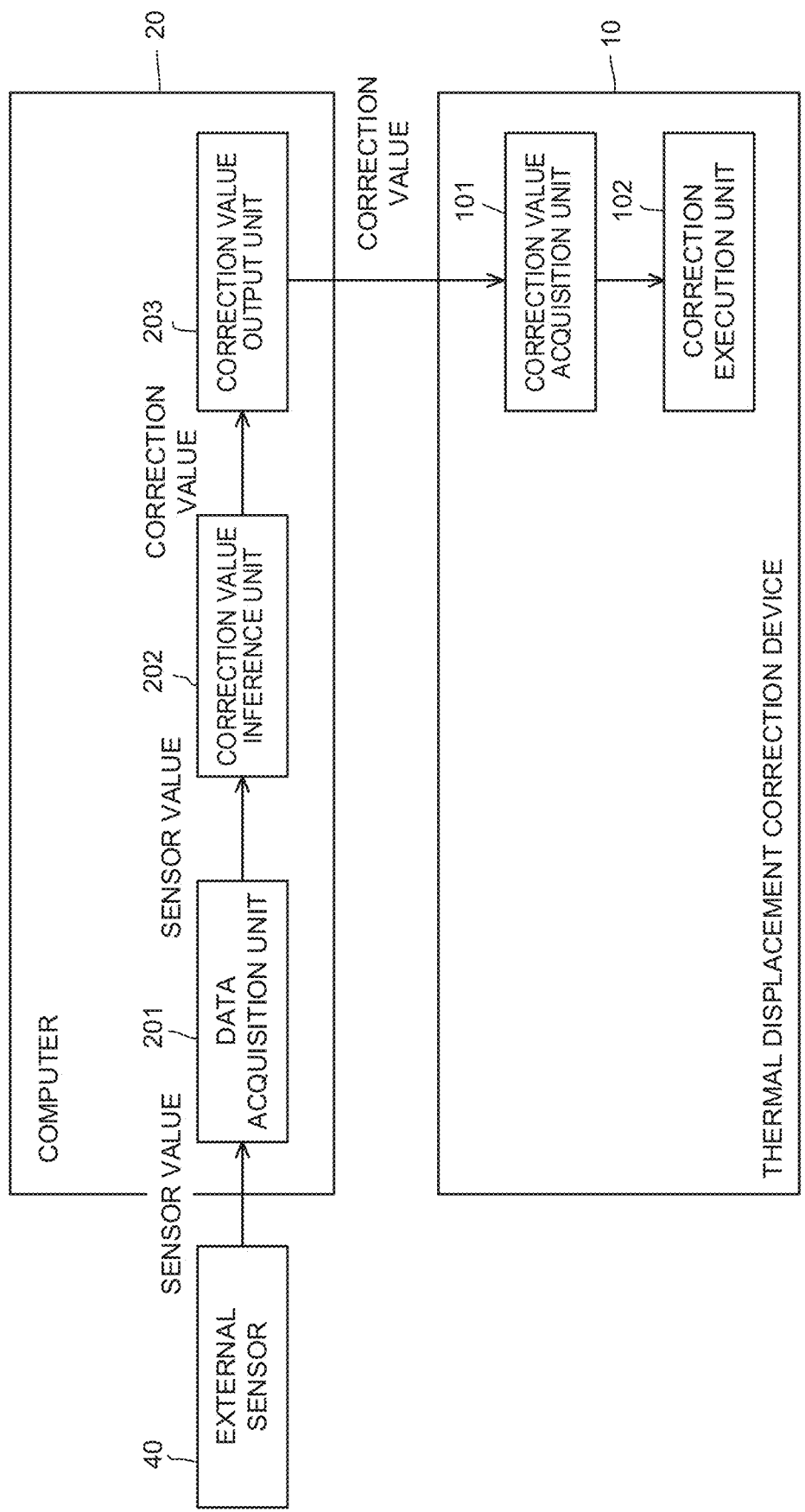
FIG. 1 is a block diagram illustrating a functional configuration of a thermal displacement correction system 1 according to a first embodiment.

The configuration of a thermal displacement correction system 1 according to an embodiment of the present invention will be described.

The thermal displacement correction system 1 includes a thermal displacement correction device 10 and a computer 20. The thermal displacement correction device 10 is typically a machine control device such as a numerical control device and a robot control device. The computer 20 is typically an information processing device such as a server and a personal computer. It should be noted that the computer 20 may be a single information processing device or may be constituted by a plurality of information processing devices that perform distributed processing. The thermal displacement correction device 10 and the computer 20 are communicably connected to each other via a communication network. The thermal displacement correction system 1 may include one or more thermal displacement correction devices 10 and one or more computers 20.

Figure 11:
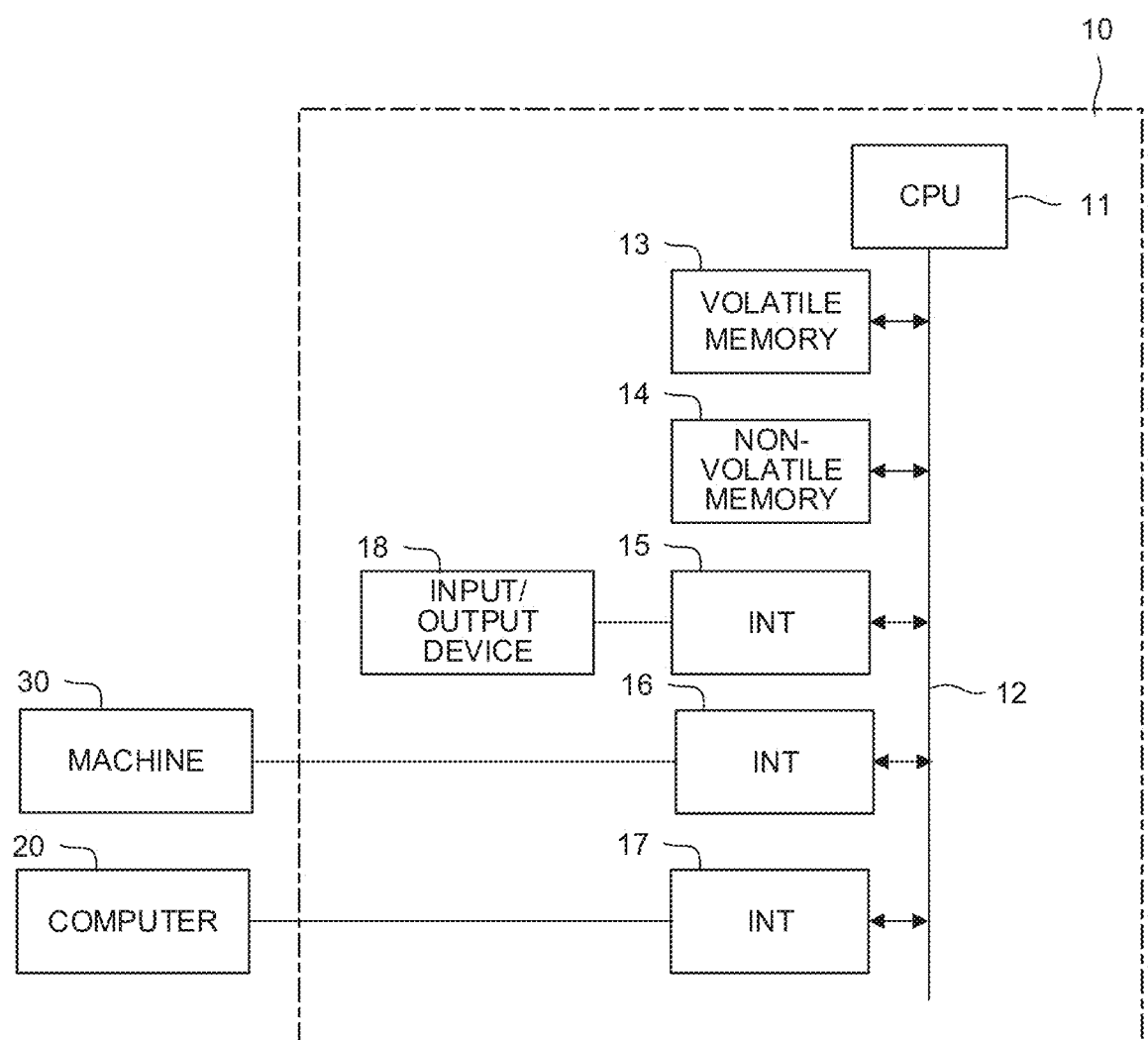
FIG. 11 is a hardware configuration diagram of a thermal displacement correction device 10.

FIG. 11 is a schematic hardware configuration diagram of the main components of the thermal displacement correction device 10. The thermal displacement correction device 10 includes a CPU 11, a bus 12, a volatile memory 13, a non-volatile memory 14, an interface 15, an interface 16, an interface 17, and an input/output device 18.

The CPU 11 is a processor that controls the entire thermal displacement correction device 10. The CPU 11 reads a program stored in the non-volatile memory 14 through the bus 12 and controls the entire thermal displacement correction device 10 according to the program.

The non-volatile memory 14 is configured as a memory that can maintain its memory state even when the thermal displacement correction device 10 is turned off, for example, by being backed up by an unillustrated battery. The programs and data stored in the non-volatile memory 14 may be loaded into the volatile memory 13 when used. The volatile memory 13 stores not only programs and data loaded from the non-volatile memory 14, but also temporary calculation data, display data, and other data inputted through the input/output device 18.

Examples of the input/output device 18 include a display and a keyboard. A command and data inputted from a keyboard as the input/output device 18 is passed to the CPU 11 through the interface 15. Further, the display data outputted from the CPU 11 is displayed on a display as the input/output device 18 through the interface 15.

The machine 30 is an industrial machine such as a machine tool. One or more machines 30 are connected to the thermal displacement correction device 10 via the interface 16. The data transmitted from the machine 30 is passed to the CPU 11 through the interface 16.

The computer 20 is connected to the thermal displacement correction device 10 via an interface 17. The data transmitted from the computer 20 via a communication network is received by the interface 17 and passed to the CPU 11. Further, the data outputted from the CPU 11 is transmitted by the interface 17 to the computer 20 via the communication network.

Figure 12:
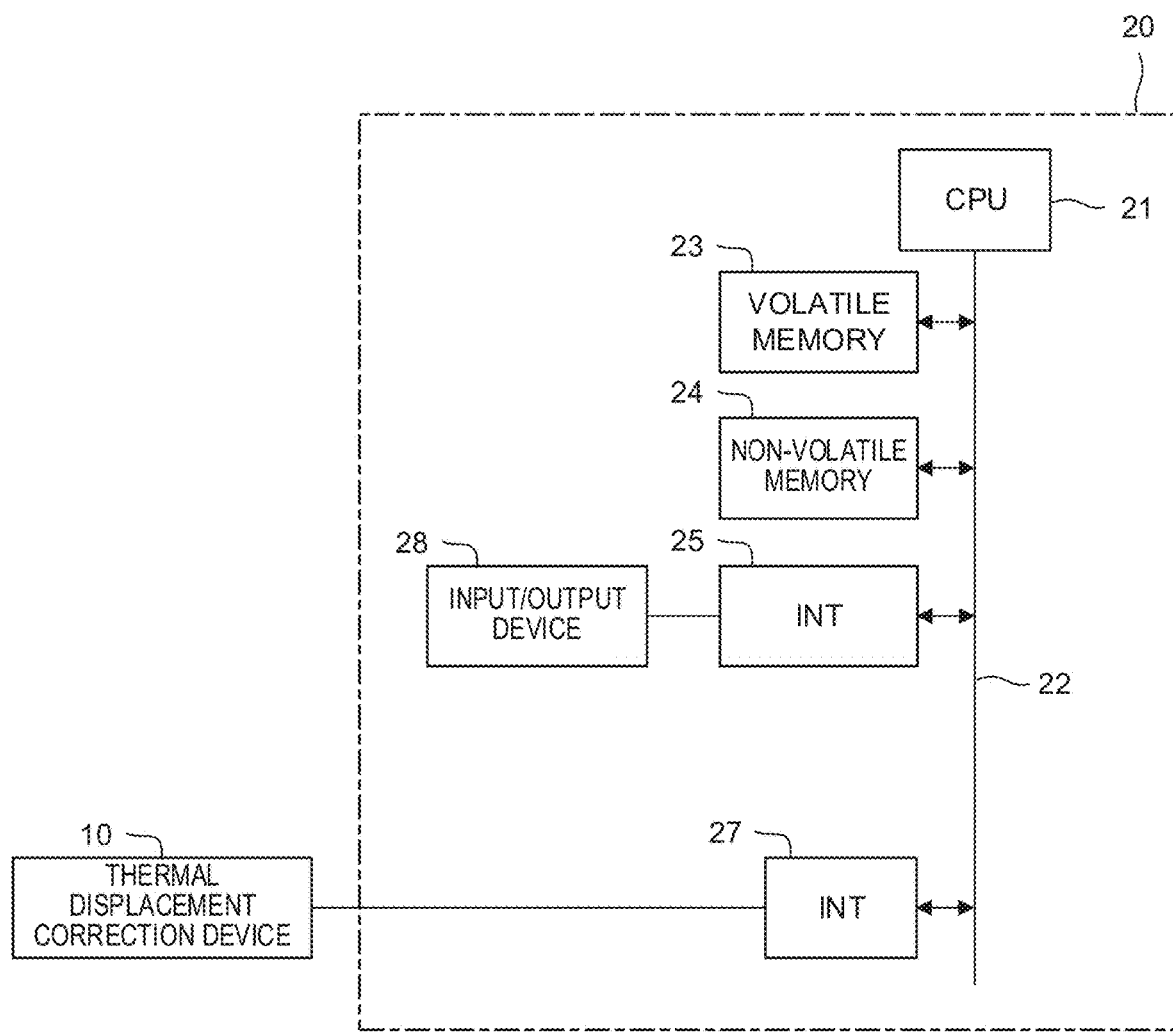
FIG. 12 is a hardware configuration diagram of a computer 20.

FIG. 12 is a schematic hardware configuration diagram of the main components of the computer 20. The computer 20 includes a CPU 21, a bus 22, a volatile memory 23, a non-volatile memory 24, an interface 25, an interface 27, and an input/output device 28.

The CPU 21 is a processor that controls the entire computer 20. The CPU 21 reads a program stored in the non-volatile memory 24 through the bus 22 and controls the entire computer 20 according to the program.

The non-volatile memory 24 is configured as a memory that can maintain its memory state even when the computer 20 is turned off, for example, by being backed up by an unillustrated battery. The programs and data stored in the non-volatile memory 24 may be loaded into the volatile memory 23 when used. The volatile memory 23 stores not only programs and data loaded from the non-volatile memory 24, but also temporary calculation data, display data, and other data inputted through the input/output device 28.

Examples of the input/output device 28 include a display and a keyboard. A command and data inputted from a keyboard as the input/output device 28 is passed to the CPU 21 through the interface 25. Further, the display data outputted from the CPU 21 is displayed on a display as the input/output device 28 through the interface 25.

The thermal displacement correction device 10 is connected to the computer 20 via the interface 27. The data transmitted from the thermal displacement correction device 10 via the communication network is received by the interface 27 and passed to the CPU 21. Further, the data outputted from the CPU 21 is transmitted by the interface 27 to the thermal displacement correction device 10 via the communication network.

First Embodiment

As a first embodiment, the description will focus on the thermal displacement correction system 1 in which the computer 20 calculates a correction value based on the environmental data acquired from external sensors 40 and the like; and the thermal displacement correction device 10 acquires the correction value from the computer 20 and executes thermal displacement correction.

FIG. 1 is a block diagram illustrating a schematic functional configuration of the thermal displacement correction system 1 according to the first embodiment. The computer 20 includes a data acquisition unit 201, a correction value inference unit 202, and a correction value output unit 203. The thermal displacement correction device 10 includes a correction value acquisition unit 101 and a correction execution unit 102.

Figure 7:
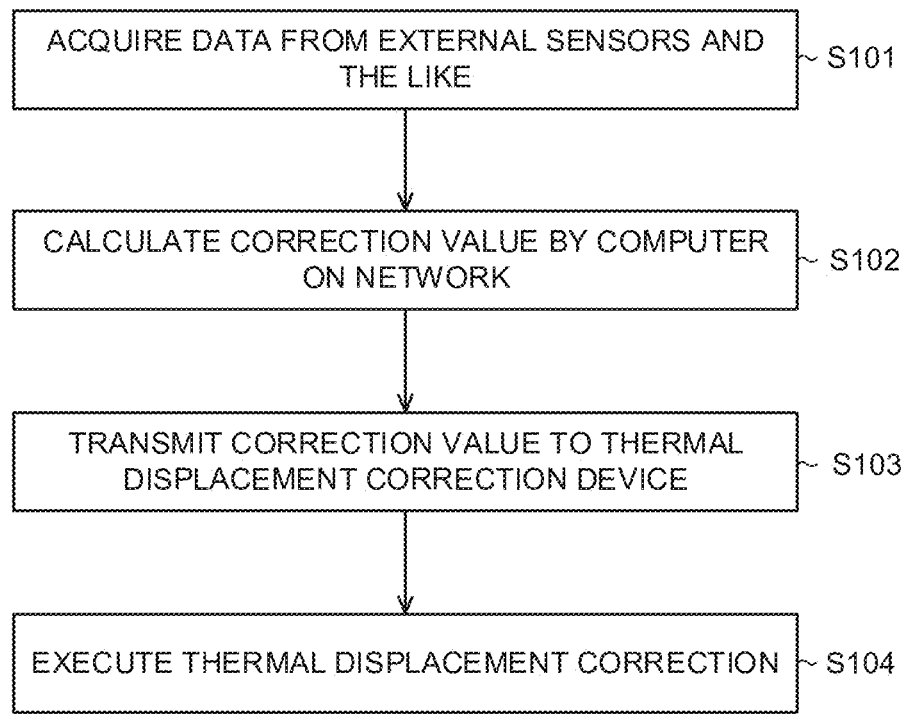
FIG. 7 is a flowchart illustrating an operation of the thermal displacement correction system 1 according to the first embodiment.

FIG. 7 is a flowchart illustrating an operation of the thermal displacement correction system 1 according to the first embodiment. According to this flowchart, the operation of each component of the thermal displacement correction system 1 will be described.

In S101, the data acquisition unit 201 of the computer 20 receives environmental data (typically numerical data) from one or more external sensors 40 and the like. The external sensor 40 is typically a device that can acquire data on an environment in which the machine is installed. When both the external sensors 40 and the computer 20 are configured to be connected to an intra-factory network and the like so as to transmit the environmental data from the external sensors 40 to the computer 20, data on the environment can be collected in the computer 20. Examples of the data acquired by the external sensors 40 may include the opening/closing state of a shutter at an entrance of a factory, the room temperature, the machine position in the factory (a distance from a predetermined base point (such as a shutter), the coordinate values indicating a relative position from a predetermined base point, the lot number indicating an approximate position in the factory, or the like), the season, the temperature, the location of the factory (such as (latitude and longitude), the operating state of the machine in the factory (such as the number of operating machines), and the number of people working in the factory.

In addition to the environmental data acquired from the external sensors 40, the data acquisition unit 201 can acquire any data that can be used to calculate correction values. For example, the data acquisition unit 201 may acquire data inputted by an operator through the input/output device 28.

In S102, the correction value inference unit 202 calculates a correction value using the environmental data acquired by the data acquisition unit 201. The correction value inference unit 202 typically holds a correction formula in advance and obtains the correction value by substituting the environmental data into the correction formula. Note that the unit of the correction value is the distance ($\mu$m) or the angle.

In S103, the correction value output unit 203 outputs the correction value calculated by the correction value inference unit 202 to the correction value acquisition unit 101 of the thermal displacement correction device 10 via the communication network.

In S104, the correction value acquisition unit 101 of the thermal displacement correction device 10 acquires the correction value outputted by the correction value output unit 203 via the communication network. The correction execution unit 102 executes thermal displacement correction using the correction value acquired by the correction value acquisition unit 101. Note that the execution method for the thermal displacement correction is well known, and thus the detailed explanation is omitted.

In the first embodiment, the computer 20 calculates the correction value using the environmental data acquired from the external sensors 40 and the like without acquiring data from the thermal displacement correction device 10. The thermal displacement correction device 10 performs thermal displacement correction using the correction value calculated by the computer 20.

Thus, according to the first embodiment, the calculation resources of the computer 20 on the network can be used to calculate the correction value. The computer 20 can also acquire the environmental data required to calculate the correction value without passing through the thermal displacement correction device 10, resulting in a great reduction in the load of the thermal displacement correction device 10 as compared with the prior art. Further, the computer 20 can relatively easily update or change the correction formula than the thermal displacement correction device 10, and thus can also flexibly follow technical innovation and the like. Furthermore, the computer 20 can easily collect data on the environment that has been hardly acquired by the thermal displacement correction device 10 alone and thus can obtain a highly accurate correction value using conventionally unavailable data. The environmental data and the correction value are transmitted and received via the network between the computer 20 and the thermal displacement correction device 10. The thermal displacement proceeds relatively slowly, and the correction does not need strict real-time performance, and thus a network delay can be tolerated to a certain extent. In other words, the thermal displacement correction is suitable for processing on the network.

Second Embodiment

As a second embodiment, the description will focus on the thermal displacement correction system 1 in which the computer 20 calculates a correction value based on the environmental data acquired from external sensors 40 and the like and the device data acquired from the thermal displacement correction device 10; and the thermal displacement correction device 10 acquires the correction value from the computer 20 and executes thermal displacement correction.

Figure 2:
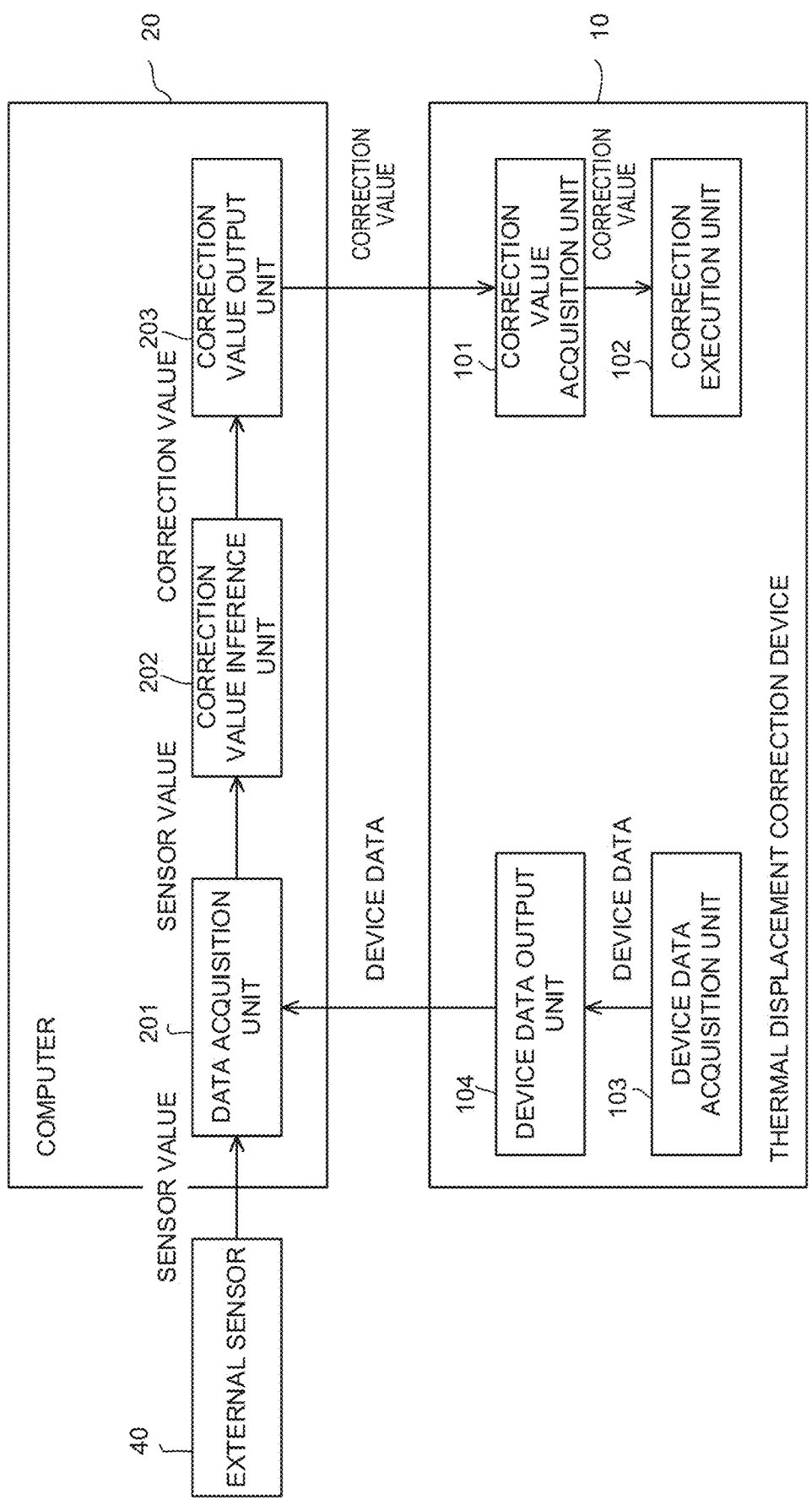
FIG. 2 is a block diagram illustrating a functional configuration of a thermal displacement correction system 1 according to a second embodiment.

FIG. 2 is a block diagram illustrating a schematic functional configuration of the thermal displacement correction system 1 according to the second embodiment. The computer 20 includes a data acquisition unit 201, a correction value inference unit 202, and a correction value output unit 203. The thermal displacement correction device 10 includes a correction value acquisition unit 101 and a correction execution unit 102. As a feature of the second embodiment, the thermal displacement correction device 10 further includes a device data acquisition unit 103 and a device data output unit 104.

Figure 8:
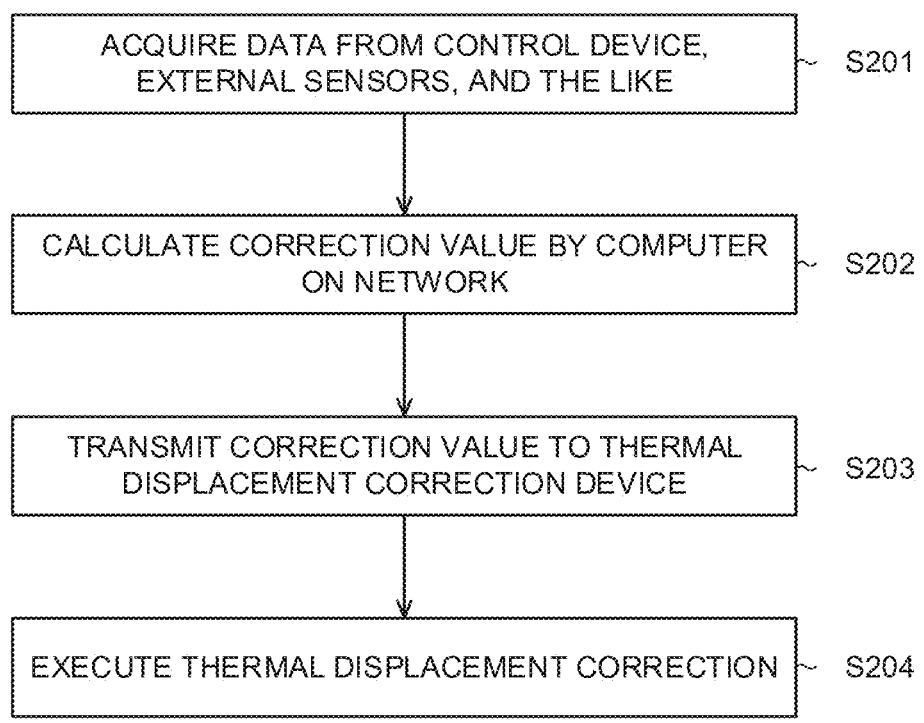
FIG. 8 is a flowchart illustrating an operation of the thermal displacement correction system 1 according to the second embodiment and the third embodiment.

FIG. 8 is a flowchart illustrating an operation of the thermal displacement correction system 1 according to the second embodiment. According to this flowchart, the operation of each component of the thermal displacement correction system 1 will be described.

In S201, the device data acquisition unit 103 of the thermal displacement correction device 10 acquires data (device data) on a state of the machine using a function of the control device. Examples of the device data acquired by the device data acquisition unit 103 may include the temperature at each position of the machine, the coolant ON/OFF state, the coolant temperature, the motor rotational speed, the motor temperature, the door open/close state of the machine, the processing speed, the operating time, and the work materials.

The device data output unit 104 outputs the device data acquired by the device data acquisition unit 103 to the data acquisition unit 201 of the computer 20 via the communication network.

The data acquisition unit 201 of the computer 20 acquires the device data outputted by the device data output unit 104 via the communication network. Further, the data acquisition unit 201 receives the environmental data from one or more external sensors 40 and the like in the same manner as in S101 of the first embodiment. The data acquisition unit 201 may acquire data and the like inputted by the operator through the input/output device 28.

In S202, the correction value inference unit 202 calculates a correction value using the environmental data and the device data acquired by the data acquisition unit 201. The correction value inference unit 202 typically holds a correction formula in advance and obtains the correction value by substituting the environmental data and the device data into the correction formula.

In S203, the correction value output unit 203 outputs the correction value calculated by the correction value inference unit 202 to the correction value acquisition unit 101 of the thermal displacement correction device 10 via the communication network.

In S204, the correction value acquisition unit 101 of the thermal displacement correction device 10 acquires the correction value outputted by the correction value output unit 203 via the communication network. The correction execution unit 102 executes thermal displacement correction using the correction value acquired by the correction value acquisition unit 101.

In the second embodiment, the computer 20 calculates the correction value using the device data acquired from the thermal displacement correction device 10 and the environmental data acquired from the external sensors 40 and the like. The thermal displacement correction device 10 performs thermal displacement correction using the correction value calculated by the computer 20.

Thus, according to the second embodiment, the calculation resources of the computer 20 on the network can be used to calculate the correction value. Further, the computer 20 can relatively easily update or change the correction formula than the thermal displacement correction device 10, and thus can also flexibly follow technical innovation and the like. Furthermore, the computer 20 not only can easily collect data on the environment that has been hardly acquired by the thermal displacement correction device 10 alone but also can use the device data reflecting individual machine states acquired by the thermal displacement correction device 10, and thus can obtain a further more accurate correction value than the first embodiment.

Third Embodiment

As a third embodiment, the description will focus on the thermal displacement correction system 1 in which the computer 20 calculates a correction value based on the environmental data acquired from external sensors 40 and the like and the device data acquired from the thermal displacement correction device 10; and the thermal displacement correction device 10 acquires the correction value from the computer 20 and executes thermal displacement correction. The computer 20 calculates the correction value using a learning model generated by machine learning.

Figure 3:
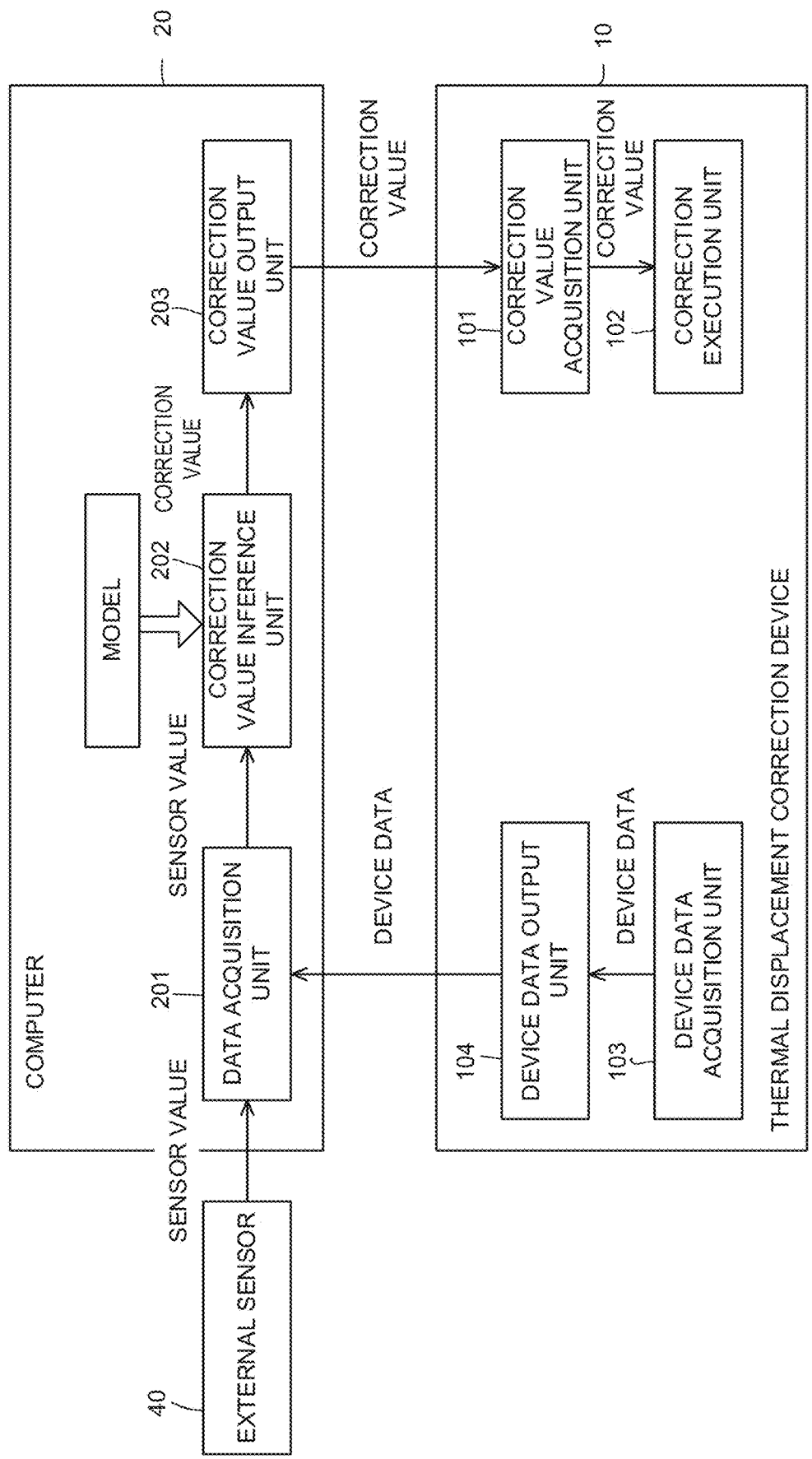
FIG. 3 is a block diagram illustrating a functional configuration of a thermal displacement correction system 1 according to a third embodiment.

FIG. 3 is a block diagram illustrating a schematic functional configuration of the thermal displacement correction system 1 according to the third embodiment. The computer 20 includes a data acquisition unit 201, a correction value inference unit 202, and a correction value output unit 203. The thermal displacement correction device 10 includes a correction value acquisition unit 101, a correction execution unit 102, a device data acquisition unit 103, and a device data output unit 104.

The correction value inference unit 202 of the third embodiment holds the learning model generated in advance by machine learning. The learning model can typically be generated by supervised learning in which a lot of set of the environmental data, the device data, and the correction value is inputted to a learning devices as teaching data to learn the correlation between the environmental data, the device data, and the correction value. The method of generating the learning model by supervised learning is well known, and thus the detailed explanation is omitted here.

The correction value inference unit 202 may calculate the correction value using a learning model that is sequentially updated by online learning as described later in a fourth embodiment.

Like the second embodiment, according to the flowchart in FIG. 8, the operation of each component of the thermal displacement correction system 1 according to the third embodiment will be described.

In S201, the device data acquisition unit 103 of the thermal displacement correction device 10 acquires data (device data) on the machine from the control device. The device data output unit 104 outputs the device data acquired by the device data acquisition unit 103 to the data acquisition unit 201 of the computer 20 via the communication network. The data acquisition unit 201 of the computer 20 acquires the device data outputted by the device data output unit 104 via the communication network. Further, the data acquisition unit 201 receives the environmental data from one or more external sensors 40 and the like in the same manner as in S101 of the first embodiment. The data acquisition unit 201 may acquire data and the like inputted by the operator through the input/output device 28.

In S202, the correction value inference unit 202 calculates a correction value using the environmental data and the device data acquired by the data acquisition unit 201. The correction value inference unit 202 of the third embodiment holds a learning model that has learned the correlation between the environmental data, the device data, and the correction value in advance by machine learning. The correction value inference unit 202 can obtain a corresponding correction value as an output by inputting the environmental data and the device data acquired by the data acquisition unit 201 to this learning model.

In S203, the correction value output unit 203 outputs the correction value calculated by the correction value inference unit 202 to the correction value acquisition unit 101 of the thermal displacement correction device 10 via the communication network.

In S204, the correction value acquisition unit 101 of the thermal displacement correction device 10 acquires the correction value outputted by the correction value output unit 203 via the communication network. The correction execution unit 102 executes thermal displacement correction using the correction value acquired by the correction value acquisition unit 101.

In the third embodiment, the computer 20 calculates the correction value by inputting the device data acquired from the thermal displacement correction device 10 and the environmental data acquired from the external sensors 40 and the like to the learning model generated in advance by machine learning. The thermal displacement correction device 10 performs thermal displacement correction using the correction value calculated by the computer 20.

Thus, according to the third embodiment, the calculation resources of the computer 20 on the network can be used to calculate the correction value. In particular, the inference of the correction value by machine learning often imposes too heavy a processing load on the thermal displacement correction device 10, leading to difficulty in calculation, and thus the configuration of the third embodiment is preferable. Furthermore, the computer 20 not only can easily collect data on the environment that has been hardly acquired by the thermal displacement correction device 10 alone but also can use the device data reflecting individual machine states acquired by the thermal displacement correction device 10, and thus can obtain a further more accurate correction value than the first embodiment.

As a modification of the third embodiment, on the premise of the configuration of the first embodiment, the correction value may be calculated using the learning model. More specifically, the computer 20 calculates the correction value without using the device data by inputting the environmental data acquired from the external sensors 40 and the like to the learning model generated in advance by machine learning. The thermal displacement correction device 10 performs thermal displacement correction using the correction value calculated by the computer 20.

This modification can also use the calculation resources of the computer 20 on the network to calculate the correction value. In particular, the inference of the correction value by machine learning often imposes too heavy a processing load on the thermal displacement correction device 10, leading to difficulty in calculation, and thus the configuration of the modification is preferable. Furthermore, the computer 20 can easily collect data on the environment that has been hardly acquired by the thermal displacement correction device 10 alone, and thus can obtain a more accurate correction value than the prior art.

The data inputted to the learning model for estimation of the correction value and for online learning may be both the environmental data and the device data, only one of them, or only a part of the environmental data and the device data. For example, the estimation of the correction value using the learning model and online learning may be performed on one of the environmental data and the device data, and the calculation of the correction value using the conventional correction formula may be performed on the other. Further, for example, regarding the data whichever of the environmental data and the device data can obtain sufficient accuracy by a correction formula, the correction value is calculated using the correction formula, and the estimation of the correction value using the learning model and online learning may be performed on the other data. This method can achieve both accuracy and computational efficiency. In this case, the correction value inference unit 202 can integrate a plurality of correction values calculated by a plurality of methods (for example, calculate a statistic such as an average), and the correction value output unit 203 can output the integrated correction value.

Fourth Embodiment

As a fourth embodiment, the description will focus on the thermal displacement correction system 1 in which the computer 20 calculates a correction value based on the environmental data acquired from external sensors 40 and the like and the device data acquired from the thermal displacement correction device 10; and the thermal displacement correction device 10 acquires the correction value from the computer 20 and executes thermal displacement correction. The computer 20 calculates the correction value using a learning model generated in advance by machine learning. Further, the computer 20 performs online learning (additional learning) using the acquired environmental data and device data and updates the learning model.

Figure 4:
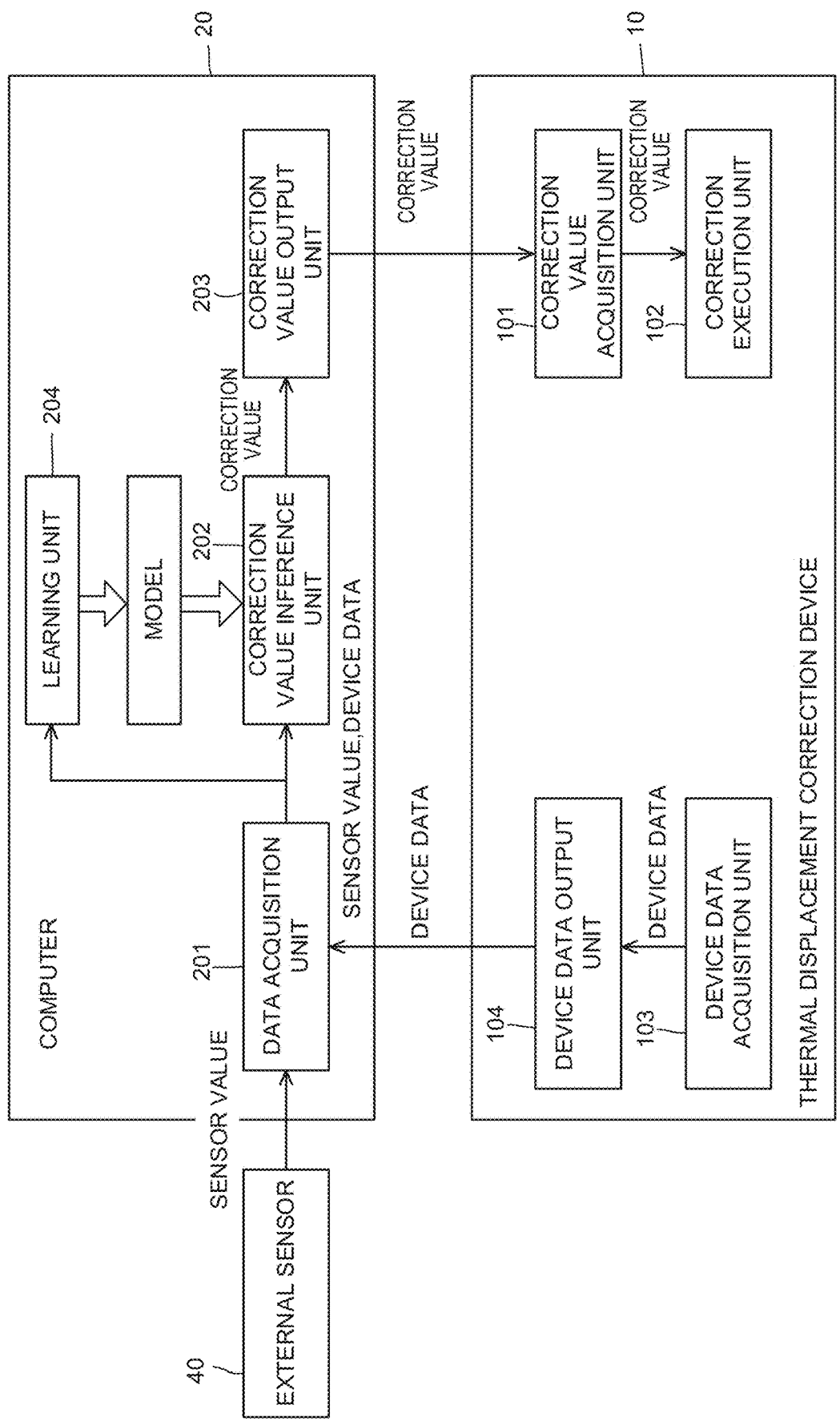
FIG. 4 is a block diagram illustrating a functional configuration of a thermal displacement correction system 1 according to a fourth embodiment.

FIG. 4 is a block diagram illustrating a schematic functional configuration of the thermal displacement correction system 1 according to the fourth embodiment. The computer 20 includes a data acquisition unit 201, a correction value inference unit 202, and a correction value output unit 203. As a feature of the fourth embodiment, the computer 20 further includes a learning unit 204. The thermal displacement correction device 10 includes a correction value acquisition unit 101, a correction execution unit 102, a device data acquisition unit 103, and a device data output unit 104.

Figure 9:
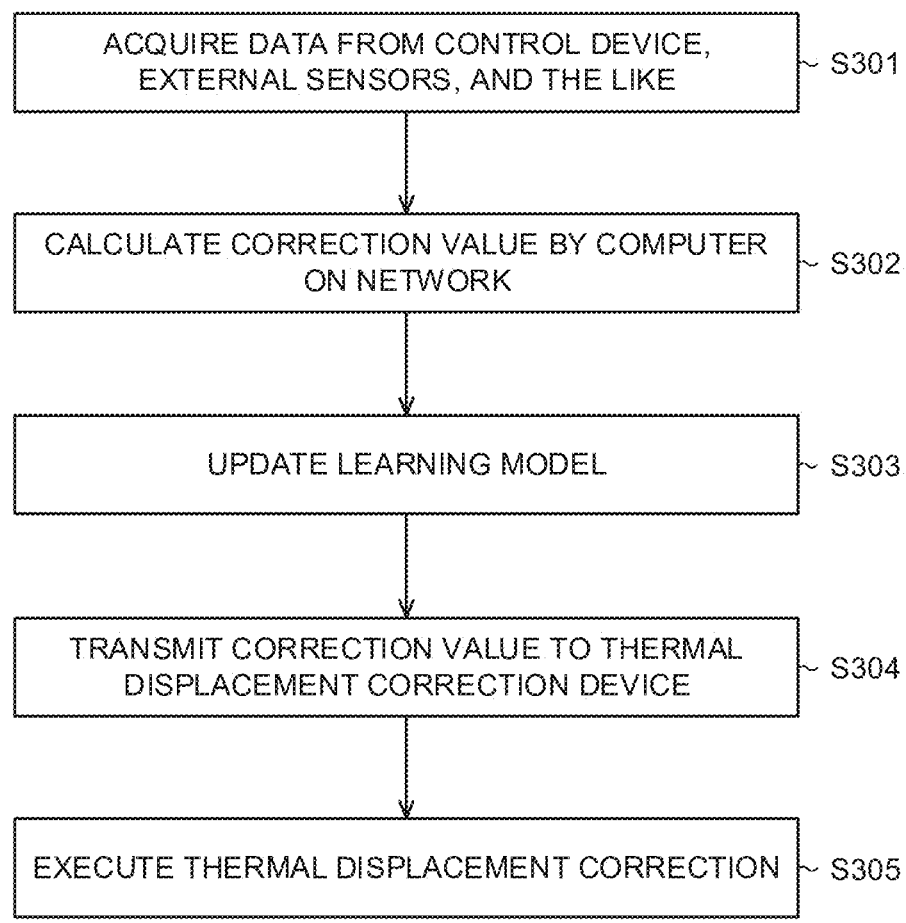
FIG. 9 is a flowchart illustrating an operation of the thermal displacement correction system 1 according to the fourth embodiment and the fifth embodiment.

FIG. 9 is a flowchart illustrating an operation of the thermal displacement correction system 1 according to the fourth embodiment. According to this flowchart, the operation of each component of the thermal displacement correction system 1 will be described.

In S301, the device data acquisition unit 103 of the thermal displacement correction device 10 acquires data (device data) on the machine using a function of the control device. The device data output unit 104 outputs the device data acquired by the device data acquisition unit 103 to the data acquisition unit 201 of the computer 20 via the communication network.

The data acquisition unit 201 of the computer 20 acquires the device data outputted by the device data output unit 104 via the communication network. Further, the data acquisition unit 201 receives the environmental data from one or more external sensors 40 and the like in the same manner as in S101 of the first embodiment. The data acquisition unit 201 may acquire data and the like inputted by the operator through the input/output device 28.

In S302, the correction value inference unit 202 calculates a correction value using the environmental data and the device data acquired by the data acquisition unit 201. Like the third embodiment, the correction value inference unit 202 holds the learning model that has learned the correlation between the environmental data, the device data, and the correction value in advance by machine learning. The correction value inference unit 202 can obtain a corresponding correction value as an output by inputting the environmental data and the device data acquired by the data acquisition unit 201 to this learning model.

In S303, the learning unit 204 performs online learning using the environmental data and the device data acquired by the data acquisition unit 201 as well as the correction value calculated by the correction value inference unit 202. More specifically, the learning unit 204 sequentially updates the learning model using the environmental data and the device data acquired by the data acquisition unit 201 as well as the correction value calculated by the correction value inference unit 202 as additional data. Note that the specific method for the online learning is well known, and thus the detailed explanation is omitted here.

In S304, the correction value output unit 203 outputs the correction value calculated by the correction value inference unit 202 to the correction value acquisition unit 101 of the thermal displacement correction device 10 via the communication network.

In S305, the correction value acquisition unit 101 of the thermal displacement correction device 10 acquires the correction value outputted by the correction value output unit 203 via the communication network. The correction execution unit 102 executes thermal displacement correction using the correction value acquired by the correction value acquisition unit 101.

In the fourth embodiment, the computer 20 calculates the correction value by inputting the device data acquired from the thermal displacement correction device 10 and the environmental data acquired from the external sensors 40 and the like to the learning model generated in advance by machine learning. The thermal displacement correction device 10 performs thermal displacement correction using the correction value calculated by the computer 20. In addition, the computer 20 sequentially updates the learning model by online learning.

Thus, according to the fourth embodiment, the calculation resources of the computer 20 on the network can be used to calculate the correction value. In particular, the inference of the correction value by machine learning often imposes too heavy a processing load on the thermal displacement correction device 10, leading to difficulty in calculation. Further, sequential updating of the model by online learning requires the corresponding resource, and thus the configuration of the third embodiment is preferable. Furthermore, the computer 20 not only can easily collect data on the environment that has been hardly acquired by the thermal displacement correction device 10 alone but also can use the device data reflecting individual machine states acquired by the thermal displacement correction device 10. In addition, the computer 20 can sequentially maintain or improve the accuracy of the learning model by online learning, and thus can obtain a further more accurate correction value than the third embodiment.

Also, as a modification of the fourth embodiment, on the premise of the configuration of the first embodiment, the correction value may be calculated using the learning model and the learning model may be configured to be sequentially updated. More specifically, the computer 20 calculates the correction value by inputting the environmental data acquired from the external sensors 40 and the like to the learning model generated in advance by machine learning. The thermal displacement correction device 10 performs thermal displacement correction using the correction value calculated by the computer 20. In addition, the computer 20 sequentially updates the learning model by online learning.

Figure 5:
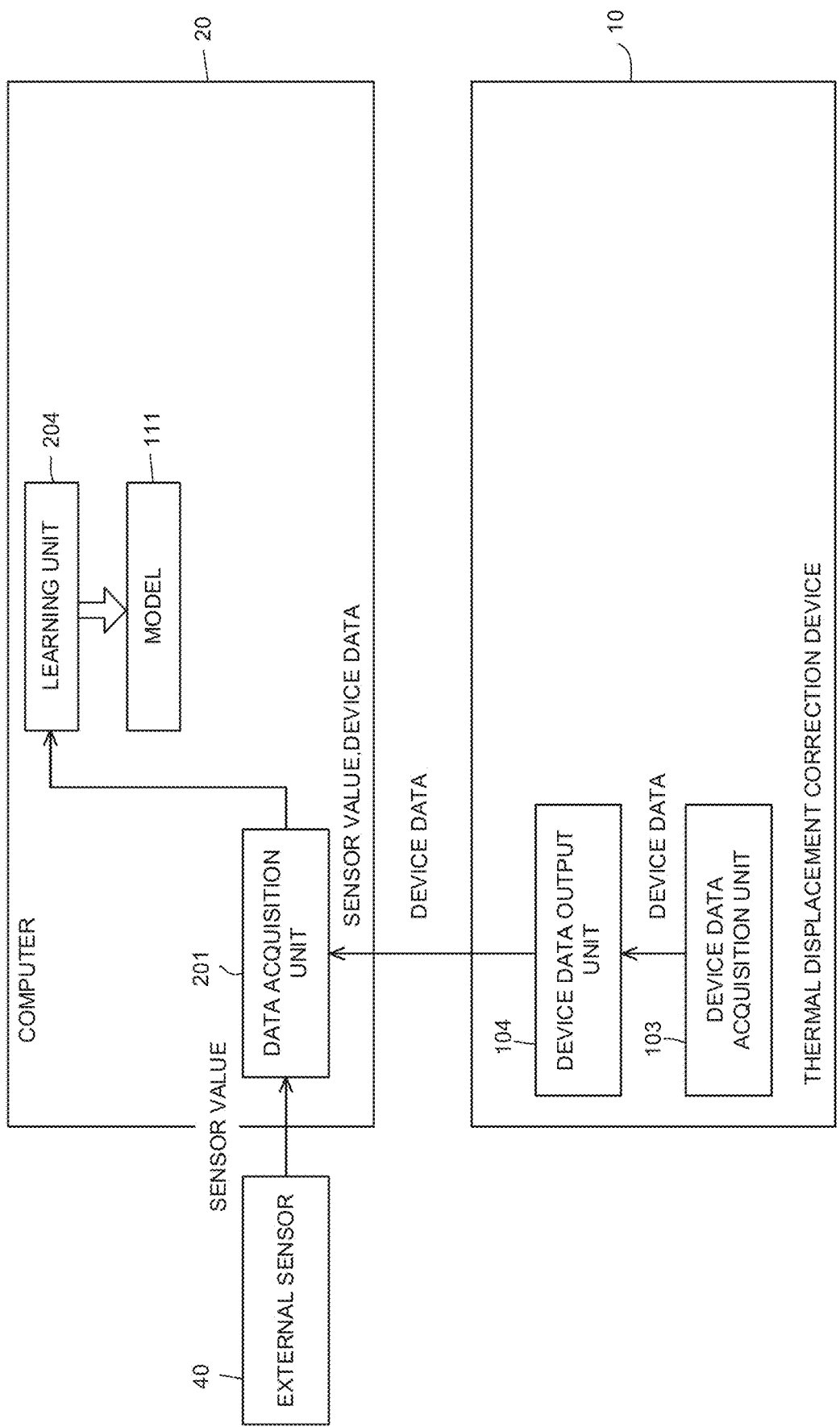
FIG. 5 is a block diagram illustrating a functional configuration of a modification of the thermal displacement correction system 1 according to the fourth embodiment.

As a second modification of the fourth embodiment, the computer 20 may execute only the sequential updating of the learning model by online learning. FIG. 5 is a block diagram illustrating a schematic functional configuration of the thermal displacement correction system 1 according to the second modification of the fourth embodiment. The computer 20 includes a data acquisition unit 201 and a learning unit 204. The thermal displacement correction device 10 includes a device data acquisition unit 103 and a device data output unit 104.

Figure 10:
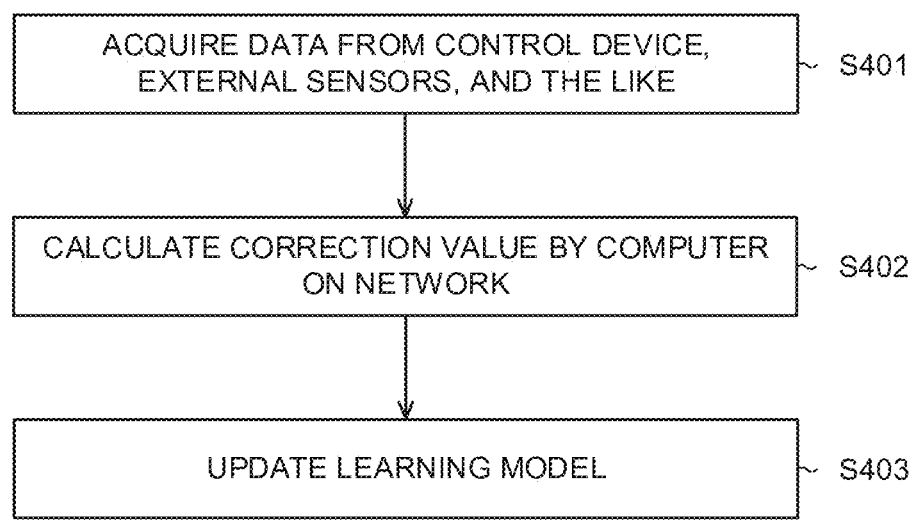
FIG. 10 is a flowchart illustrating an operation of a modification of the thermal displacement correction system 1 according to the fourth embodiment.

FIG. 10 is a flowchart illustrating an operation of the thermal displacement correction system 1 according to the second modification of the fourth embodiment. According to this flowchart, the operation of each component of the thermal displacement correction system 1 will be described.

In S401, the device data acquisition unit 103 of the thermal displacement correction device 10 acquires data (device data) on the machine using a function of the control device. The device data output unit 104 outputs the device data acquired by the device data acquisition unit 103 to the data acquisition unit 201 of the computer 20 via the communication network.

The data acquisition unit 201 of the computer 20 acquires the device data outputted by the device data output unit 104 via the communication network. Further, the data acquisition unit 201 receives the environmental data from one or more external sensors 40 and the like in the same manner as in S101 of the first embodiment. The data acquisition unit 201 may acquire data and the like inputted by the operator through the input/output device 28.

In S402, the correction value inference unit 202 calculates a correction value using the environmental data and the device data acquired by the data acquisition unit 201. Like the third embodiment, the correction value inference unit 202 can obtain a corresponding correction value as an output by inputting the environmental data and the device data acquired by the data acquisition unit 201 to the learning model that has learned the correlation between the environmental data, the device data, and the correction value in advance by machine learning.

In S403, the learning unit 204 performs online learning using the environmental data and the device data acquired by the data acquisition unit 201 as well as the correction value calculated by the correction value inference unit 202. More specifically, the learning unit 204 sequentially updates the learning model using the environmental data and the device data acquired by the data acquisition unit 201 as well as the correction value calculated by the correction value inference unit 202 as additional data.

In the second modification of the fourth embodiment, the computer 20 sequentially updates the learning model by online learning using the device data acquired from the thermal displacement correction device 10 and the environmental data acquired from the external sensors 40 and the like.

Thus, the second modification of the fourth embodiment can sequentially update the learning model using the calculation resources of the computer 20 on the network and can sequentially maintain or improve the accuracy of the learning model. The sequential updating of the model by online learning requires the corresponding resource, and thus the configuration of the second modification of the fourth embodiment is preferable.

Fifth Embodiment

As a fifth embodiment, the description will focus on the thermal displacement correction system 1 in which the computer 20 updates the learning model and estimates the correction value using the learning model based on the environmental data acquired from the external sensors 40 and the like as well as the device data acquired from a plurality of thermal displacement correction devices 10; and each of the thermal displacement correction devices 10 acquires the correction value from the computer 20 and executes thermal displacement correction.

Figure 6:
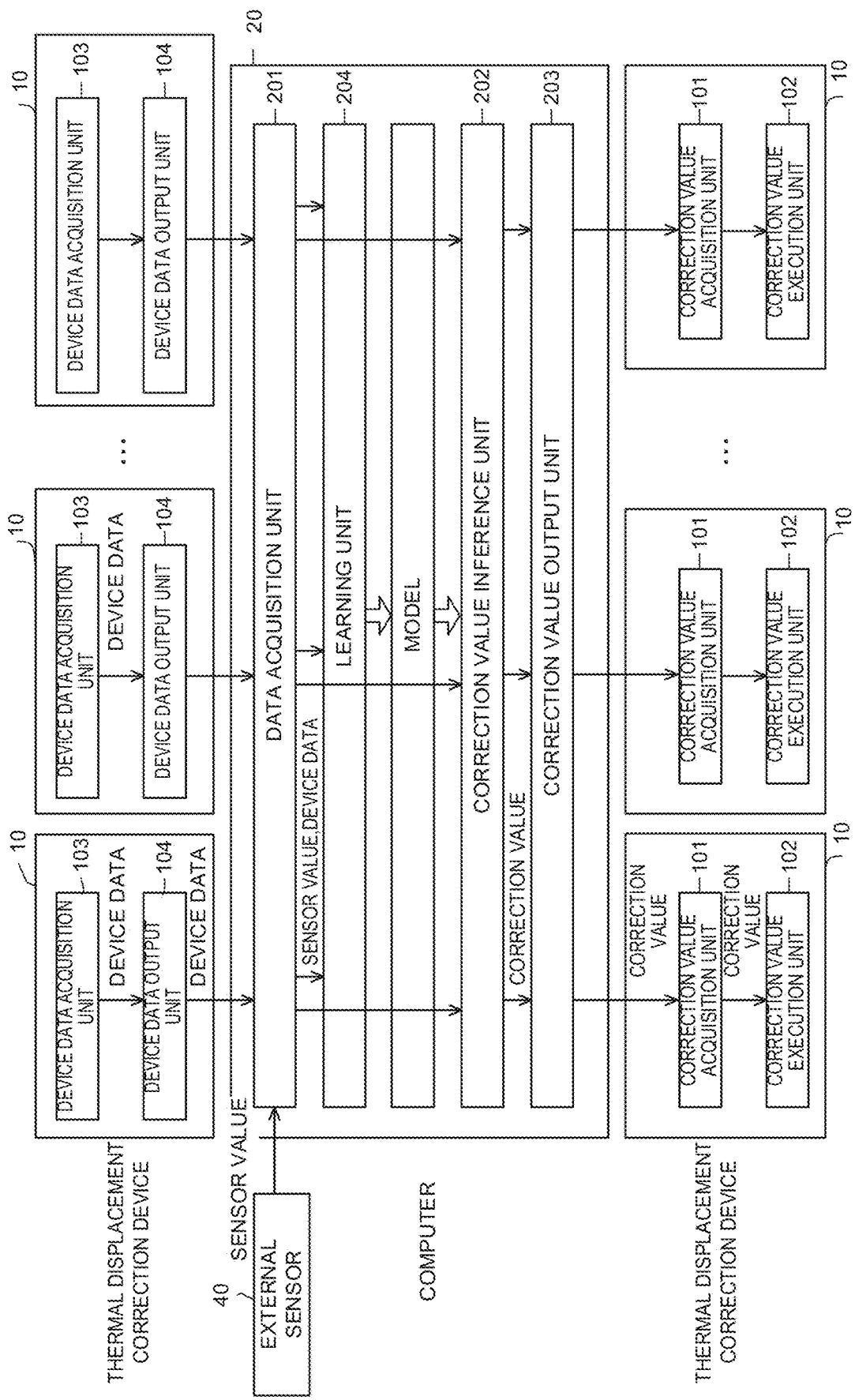
FIG. 6 is a block diagram illustrating a functional configuration of a thermal displacement correction system 1 according to a fifth embodiment.

FIG. 6 is a block diagram illustrating a schematic functional configuration of the thermal displacement correction system 1 according to the fifth embodiment. The computer 20 includes a data acquisition unit 201, a correction value inference unit 202, a correction value output unit 203, and a learning unit 204. As a feature of the fifth embodiment, a plurality of thermal displacement correction devices 10 are connected to the computer 20. Each of the thermal displacement correction devices 10 includes a correction value acquisition unit 101, a correction execution unit 102, a device data acquisition unit 103, and a device data output unit 104.

Each of the plurality of thermal displacement correction devices 10 operates according to the fourth embodiment in relation to the computer 20 (see FIG. 9).

More specifically, the device data acquisition unit 103 of each of the thermal displacement correction devices 10 acquires data (device data) on the machine from the control device. The device data output unit 104 outputs the device data to the data acquisition unit 201 of the computer 20. The data acquisition unit 201 of the computer 20 acquires the device data outputted by the device data output unit 104 of each of the thermal displacement correction devices 10. Further, the data acquisition unit 201 receives the environmental data from one or more external sensors 40 and the like. The data acquisition unit 201 may acquire data and the like inputted by the operator through the input/output device 28 (S301).

The correction value inference unit 202 inputs the environmental data and the device data acquired by the data acquisition unit 201 to the learning model and obtains a corresponding correction value as an output (S302).

The learning unit 204 performs online learning using the environmental data and the device data acquired by the data acquisition unit 201 as well as the correction value calculated by the correction value inference unit 202 (S303).

The correction value output unit 203 outputs the correction value outputted by the correction value inference unit 202 to the correction value acquisition unit 101 of each of the thermal displacement correction devices 10 (S304).

The correction value acquisition unit 101 of each of the thermal displacement correction devices 10 acquires the correction value outputted by the correction value output unit 203. The correction execution unit 102 executes thermal displacement correction using the acquired correction value (S305).

In the fifth embodiment, the computer 20 calculates the correction value by inputting the device data acquired from the plurality of thermal displacement correction devices 10 as well as the environmental data acquired from the external sensors 40 and the like to the learning model generated in advance by machine learning. Each of the plurality of thermal displacement correction devices 10 performs thermal displacement correction using the correction value calculated by the computer 20.

Thus, according to the fifth embodiment, the calculation resources of the computer 20 on the network can be used to calculate the correction value. In particular, the machine learning in a distributed environment like the fifth embodiment often imposes too heavy a processing load on the thermal displacement correction device 10, leading to difficulty in calculation, and thus the configuration of the fifth embodiment is preferable. Further, the computer 20 not only can easily collect data on the environment that has been hardly acquired by the thermal displacement correction device 10 alone but also can use the device data reflecting individual machine states acquired by the thermal displacement correction device 10, and thus can obtain a further more accurate correction value than the first embodiment.

The learning model used and updated in the fifth embodiment may be common to a plurality of thermal displacement correction devices 10 or may be independent for each of the thermal displacement correction devices 10. For example, if the plurality of thermal displacement correction device 10 have common characteristics (for example, the machines have common machine types, the thermal displacement has a similar expression tendency, the machines are installed in a similar environment in the factory, and the like), the accuracy of the learning model can be efficiently improved using the common learning model. Meanwhile, each of the thermal displacement correction devices 10 can estimate a precise correction value reflecting different characteristics for each machine using a learning model independent for each thermal displacement correction device 10.

A plurality of learning models may be used according to the quality of input data. For example, in the case of an almost uniform intra-factory environment or the like, the environmental data may be efficiently used by using and updating a learning model common to a plurality of thermal displacement correction devices 10; and the device data may be used to reflect individual characteristics by using and updating a learning model independent for each of the thermal displacement correction devices 10. Further, for example, among the environmental data and the device data, data with high commonality among machines (the examples of the environmental data include: the opening/closing state of a shutter at an entrance of a factory, the lot number indicating an approximate position in the factory, the season, the temperature, the location of the factory (such as latitude and longitude), the operating state of the machine in the factory (such as the number of operating machines), the number of people working in the factory; and the examples of the device data include: work materials and the like) may be efficiently used by using and updating the learning model common to the plurality of thermal displacement correction devices 10; and data with a strong individuality (the examples of the environmental data include: the room temperature, the machine position in the factory (a distance from a predetermined base point (such as a shutter), the coordinate values indicating a relative position from a predetermined base point), and the like; and the examples of the device data include: the temperature at each position of the machine, the coolant ON/OFF state, the coolant temperature, the motor rotational speed, the motor temperature, the door open/close state of the machine, the processing speed, the operating time, and the like) may be used to reflect individual characteristics by using and updating the learning model independent for each of thermal displacement correction devices 10.

When a plurality of learning models are used in combination, the correction value inference unit 202 can integrate a plurality of correction values calculated by a plurality of methods (for example, calculate a statistic such as an average), and the correction value output unit 203 can output the integrated correction value.

As the learning model, there may be adopted a new learning model (distilled model) generated by distilling the learning model generated by another thermal displacement correction system 1. In particular, in the case of the learning model using data with high commonality among a plurality of machines, a learning model is generated by the above described embodiments in one thermal displacement correction system 1, and then a simplified model trained to use the same output as the learning model (complex model) is generated, thereby to allow other thermal displacement correction systems 1 to use this simplified model.

It should be noted that the present invention is not limited to the above described embodiments and can be implemented in various embodiments by making appropriate modifications. For example, the learning parameters and the machine learning methods (such as supervised learning and online learning) described in the above embodiments are only examples, and thus any other learning parameters and machine learning methods may be adopted as needed. Further, the order of processing and the like described in the above embodiments may be appropriately replaced without departing from the spirit and scope of the present invention.

Hereinbefore, the embodiments of the present invention have been described, but the present invention is not limited to the examples of the above described embodiments and can be implemented in other embodiments by making appropriate modifications.

The invention claimed is:

1. A thermal displacement correction system correcting thermal displacement caused by processing performed by a machine, the thermal displacement correction system comprising:
   a thermal displacement correction device connected to the machine; and
   a computer connected to the thermal displacement correction device via a network, wherein
   the computer comprises:
   a data acquisition unit acquiring environmental data on an external environment of the machine via the network;
   a correction value inference unit calculating a correction value using the environmental data; and
   a correction value output unit outputting the correction value to the network, wherein
   the thermal displacement correction device comprises:
   a correction value acquisition unit acquiring the correction value via the network; and
   a correction execution unit performing thermal displacement correction using the correction value.

2. The thermal displacement correction system according to claim 1, wherein
   the thermal displacement correction device further comprises a device data acquisition unit and a device data output unit, wherein
   the device data acquisition unit acquires device data indicating a state of the machine,
   the device data output unit outputs the device data to the network, and
   the correction value inference unit calculates the correction value using the environmental data and the device data.

3. The thermal displacement correction system according to claim 2, wherein
   the correction value inference unit calculates the correction value using a learning model generated in advance by machine learning.

4. The thermal displacement correction system according to claim 3, wherein
   the computer further comprises a learning unit, wherein
   the learning unit updates the learning model using at least one of the environmental data and the device data.

5. The thermal displacement correction system according to claim 3, wherein
   the thermal displacement correction system comprises a plurality of thermal displacement correction devices, and
   the computer is connected to the plurality of thermal displacement correction devices via the network.

6. A computer outputting a correction value for correcting thermal displacement caused by processing performed by a machine, the computer comprising:
   a thermal displacement correction device connected to the machine;
   a data acquisition unit connected via a network and acquiring environmental data on an external environment on the machine via the network;
   a correction value inference unit calculating a correction value using the environmental data; and
   a correction value output unit outputting the correction value to the network.

* * * * *